Figure 1:
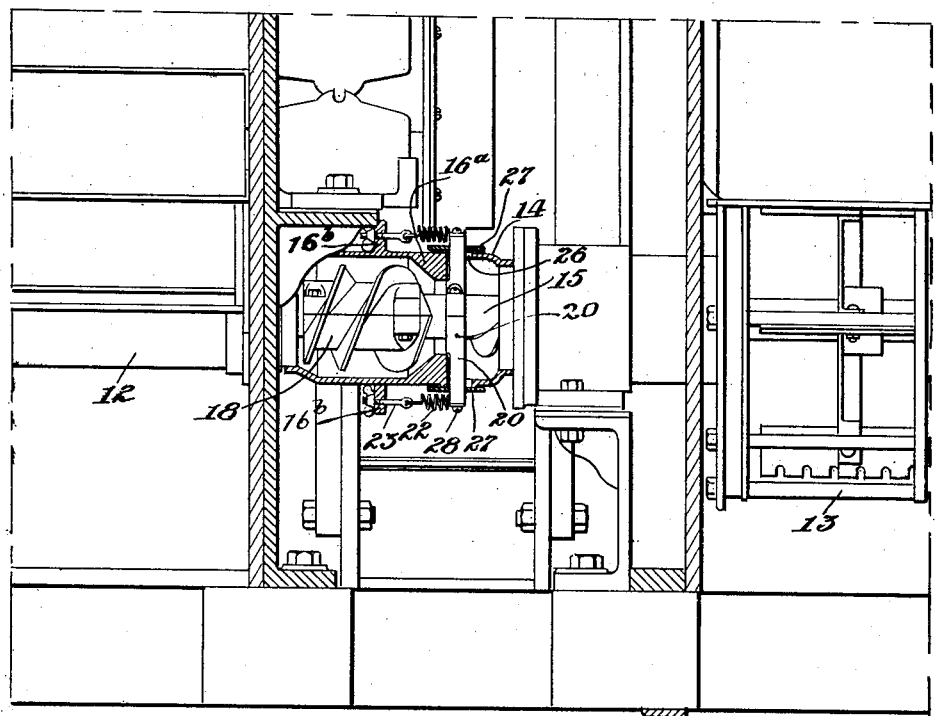

E. T. POLLARD AND W. N. MORLEY.
FLOUR MILL.
APPLICATION FILED DEC. 8, 1919.

1,348,049.

Patented July 27, 1920.
2 SHEETS—SHEET 1.

Inventors:
Edson T. Pollard,
William N. Morley,
by Calvert Calvert
Att'ys.

E. T. POLLARD AND W. N. MORLEY.
FLOUR MILL.
APPLICATION FILED DEC. 8, 1919.
1,348,049.
Patented July 27, 1920.
2 SHEETS—SHEET 2.
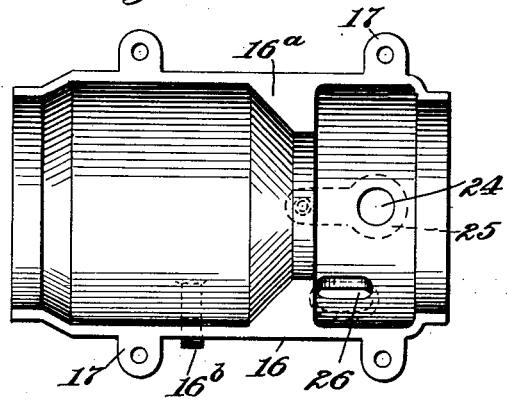
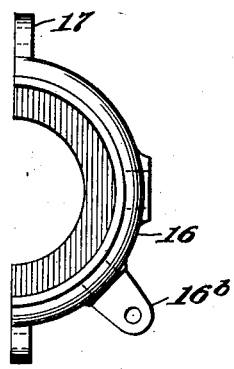
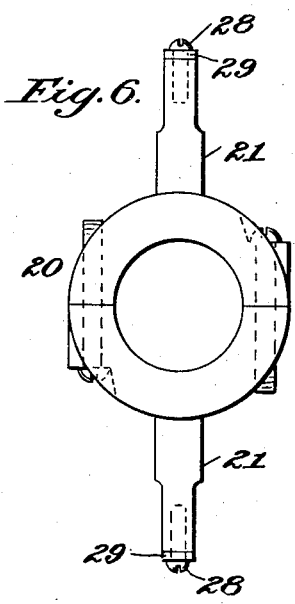
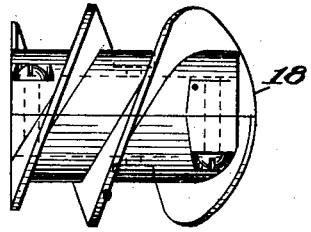
Inventors:
Edson T. Pollard,
William N. Morley,
by Calvert & Calvert
Att'ys.

UNITED STATES PATENT OFFICE.

EDSON T. POLLARD, OF NIAGARA FALLS, NEW YORK, AND WILLIAM N. MORLEY, OF TORONTO, CANADA.

FLOUR-MILL.

1,348,049.  Specification of Letters Patent.  Patented July 27, 1920.

Application filed December 8, 1919. Serial No. 343,300.

*To all whom it may concern:*

Be it known that we, EDSON T. POLLARD and WILLIAM N. MORLEY, citizens of the United States, residing respectively at Niagara Falls, in the county of Niagara and State of New York, and Toronto, Canada, have invented or discovered certain new and useful Improvements in Flour-Mills, of which the following is a specification, reference being had therein to the accompanying drawings.

This invention relates to an improved disintegrator for flour mills and is more especially designed for use in connection with what is known as a "self-contained" mill, such as that shown in U. S. Patent to Tattersall, No. 1,037,805, dated September 3, 1912, in which a complete reduction of the grain to flour is effected in a single machine by means of breaking and reduction rolls and bolting reels, the products being carried from and to the rolls and the bolting reels until the final reduction and separation to produce the perfect flour has been effected. As the product issues from the reduction rolls it contains more or less fine flakes which, if conveyed to the bolting reels, would not pass through the fine mesh thereof, and the present invention has for its object to provide means, between the reduction rolls and the bolting reels, for disintegrating these flakes so that as the product passes to the bolting reels it will be in a suitable condition to enable all of the finely reduced product to pass through the fine mesh of the reels and thus be reclaimed as flour, instead of being carried to the reels and out with the tailings. To this end the invention comprises a disintegrator of a construction suitable to be applied to self-contained mills, of the character hereinbefore referred to, already in use, the improved disintegrator being arranged between the reduction rolls and bolting reels so that the reduced product passing through the same will be acted upon in such a manner as to break up the flakes and thus permit all of the fine flour to pass through the bolting reels. While a single disintegrator arranged between the second reducing rolls and the last bolting reel will serve a good purpose in effecting the result just referred to, it may be advisable, in many instances, also to employ the improved disintegrator between the first reduction rolls and the bolting reel to which the product of the first reduction rolls passes.

Figure 2:
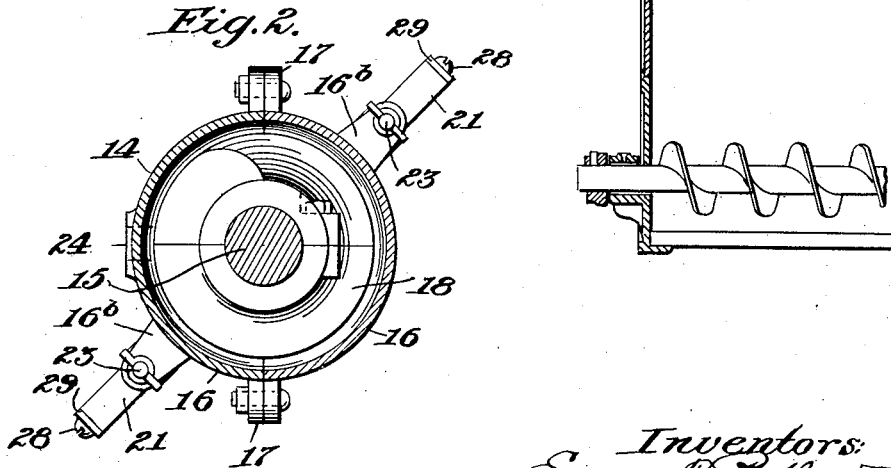

In the accompanying drawing Figure 1 is a fragmentary vertical sectional view of the lower portion of a self-contained mill embodying the present invention. Fig. 2 is an end view of the disintegrator, and Figs. 3, 4, 5 and 6 are detail views of parts of the improved disintegrator.

Referring to the drawings, 12 denotes one set of reduction rolls of a self-contained mill, such as is fully shown and described in the patent to Tattersall hereinbefore referred to, and 13 denotes a portion of the bolting reel to which the product of the reduction rolls passes. Interposed between the reduction rolls and the bolting reel is a disintegrator 14 which is preferably of such construction that it may be applied to a shaft 15 which the mill already contains, as, for example, a bolting reel shaft. To this end the disintegrator comprises a split or two-part casing 16 the two halves of which are provided with ears 17 for the reception of bolts for holding the two-part casing together. The disintegrator proper consists of a worm member 18 also formed in two parts which may be bolted together around the shaft 15 so that the worm member can be clamped or otherwise attached to the shaft by screws or bolts. The worm member 18 rotates with the shaft 15 in the casing 16, said casing having a thickened portion 16$^a$ at its delivery end to make an inclined reduced delivery passage which is, however, obstructed by a yieldingly mounted disk or ring 20 also formed in two parts attached together by screws or bolts, each half of the disk or ring being provided with an arm 21. The arms 21 are connected by springs 22 and adjustable bolts 23 with ears 16$^b$ on the disintegrator casing 16. By turning the thumb-nuts 19 on the bolts 23, the tension of the springs 22 may be varied, as may be desired. The springs 22 may be attached to the ends of the arms 21 by screws 28 and washers 29. The casing 16 will preferably be provided at its top with a test hole 24 normally closed by a swinging cover 25 pivoted to the top casing part.

From the foregoing it will be understood that the disk or ring 20 will be yieldingly held by the springs 22 against the delivery end of the disintegrator, but will be pushed away from said delivery end by the pressure of the flour induced by the rotating worm 18 and thus enable the flour, the flakes of which have been broken up by the said rotating worm, to escape from the disintegrator and pass forward to the bolting reel 13. The casing parts 16 are provided with slots 26 through which the arms 21 of the disk or ring 20 project, and which will enable the said disk or ring to move away from the delivery opening in the disintegrator casing, against the stress of the springs 22. To tightly close the openings 26 washers 27 are mounted on the arms 21 of the disk or ring 20.

It will therefore be understood that the present invention provides a split or two-part disintegrator of such construction of its different members that it may be applied to shafts already forming parts of a self-contained mill; and as this improved disintegrator is arranged between a set of reduction rolls and a bolting reel the flour, in a more or less flaky condition, will be broken up by the disintegrator before passing to the bolting reel, so that all of the fine particles thereof will pass through the fine mesh of the bolting reel.

As hereinbefore stated a disintegrator adapted to break up the flakes in the flour may be interposed between the first reduction rolls and the bolting reel to which the product goes from said rolls, as well as between the second or final reduction rolls and the bolting reel to which the product is carried from the said final or second reduction rolls. In other words, if only a single disintegrator be employed in a "self-contained" mill such disintegrator will preferably be interposed between the second or final reduction rolls and the last bolting reel, but another disintegrator may often be advantageously used between the first reduction rolls and the bolting reel to which the product is carried from said first reduction rolls.

While, for convenient illustration, the disintegrator is illustrated in Fig. 1 with the arm 21 of the disk or ring 20 vertical, as a matter of fact the disintegrator is preferably mounted as shown in Fig. 2 with the arms of the disk or ring horizontal, or approximately so.

Having thus described our invention we claim and desire to secure by Letters Patent:

1. In a self-contained flour mill, the combination with a set of reduction rolls and a bolting reel, of a shaft for operating said reel, and a disintegrator interposed between said rolls and reel and serving to break up the flakes in the product passing from said rolls to said reel, said disintegrator comprising a worm secured to said shaft, a casing in which said worm is housed, and a spring-held ring surrounding said shaft at the discharge end of said casing, said worm, casing and ring being each formed in two parts attached together and being thus adapted to be applied to existing mills.

2. An improved disintegrator comprising a casing having openings, a rotating worm member in said casing, a ring or disk normally closing the delivery end of said casing and provided with arms extending loosely through said openings, lugs on said casing, adjustable bolts mounted in said lugs, and springs connecting said bolts with said arms.

3. An improved disintegrator comprising a casing having openings, a rotating worm member in said casing, a ring or disk normally closing the delivery end of said casing and provided with arms extending through said openings, lugs on said casing, adjustable bolts mounted in said lugs, and springs connecting said bolts with said arms, said casing, worm member and disk or ring being split or formed in two parts which may be secured together in applying the disintegrator to an existing shaft in a mill.

In testimony whereof we affix our signatures.

EDSON T. POLLARD.
WILLIAM N. MORLEY.